Figure 1:
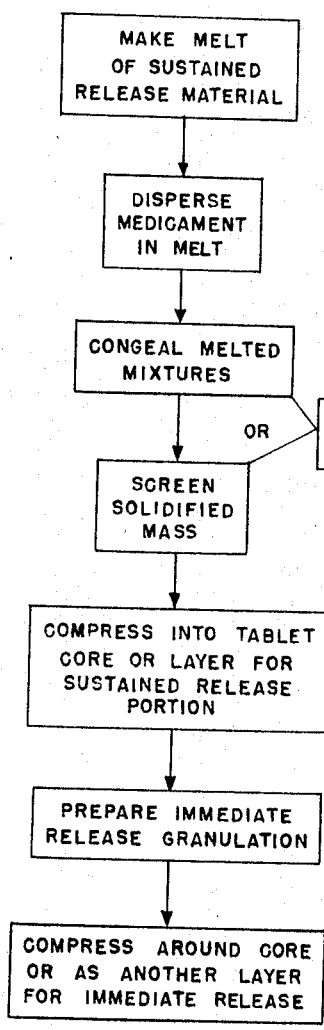
Figure 1:
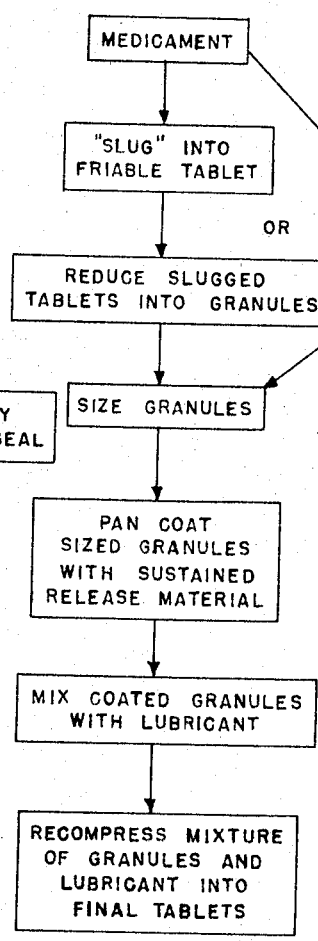
Figure 1:
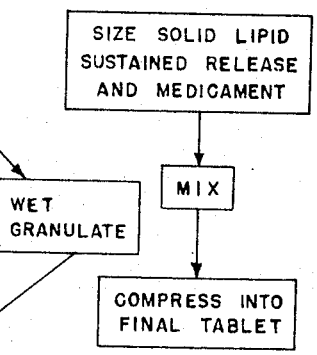

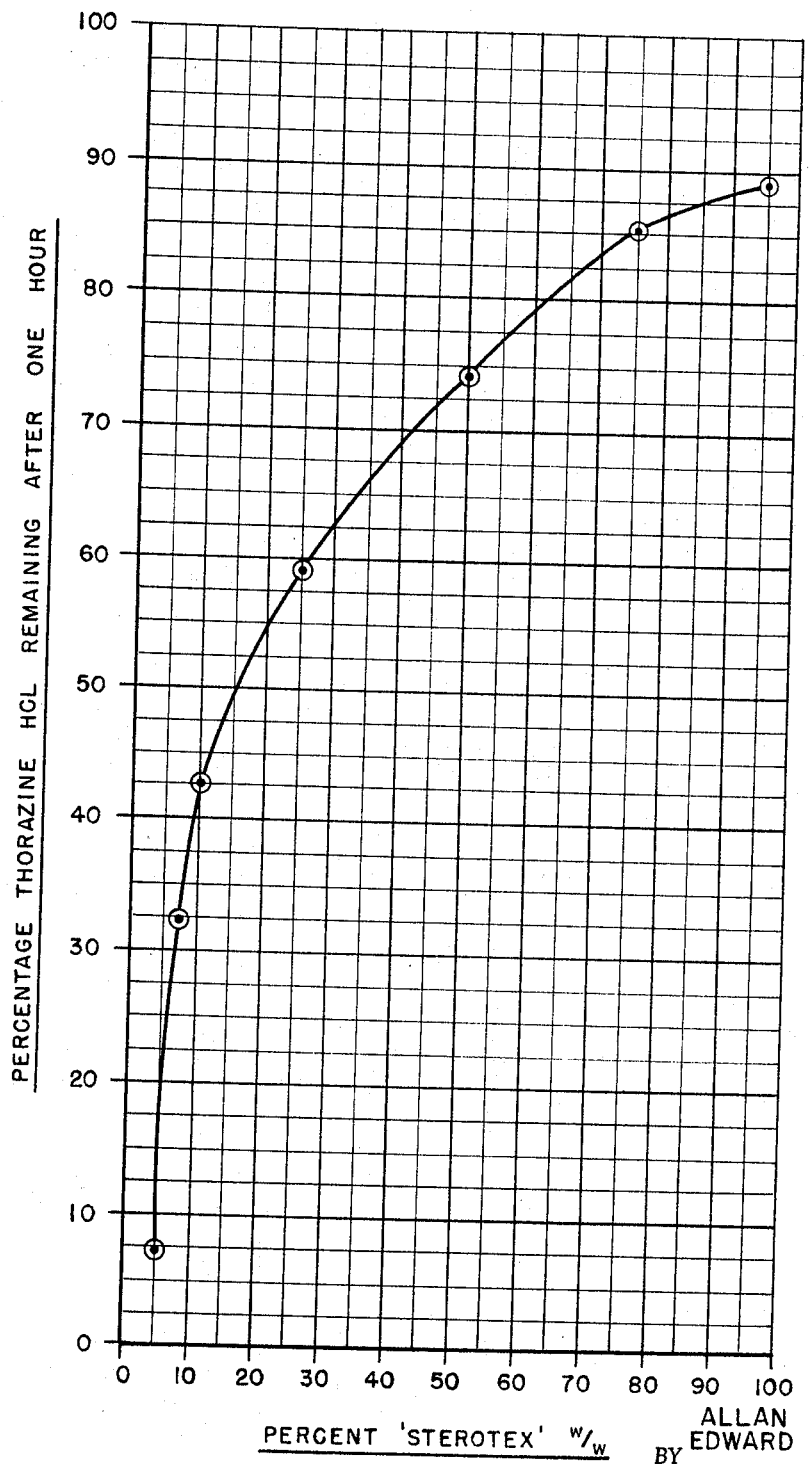

United States Patent Office 3,279,998
Patented Oct. 18, 1966

3,279,998
METHOD OF PREPARING SUSTAINED
RELEASE TABLETS
Allan M. Raff, Elkins Park, and Edward V. Svedres, Narberth, Pa., assignors to Smith Kline & French Laboratories, Philadelphia, Pa., a corporation of Pennsylvania
Filed Dec. 30, 1964, Ser. No. 422,199
3 Claims. (Cl. 167—82)

This is a continuation-in-part application based on application Serial No. 204,603, filed June 22, 1962, now abandoned.

This invention relates to a new and useful process for preparing pharmaceutical tablets. More particularly, this invention relates to a rapid and inexpensive process for preparing sustained release tablets.

Prior to the present invention the conventional method for preparing sustained release tablets was to prepare the melt of the sustained release material and then disperse the medicament throughout the melt. The melted material was allowed to congeal and the solidified mass was then screened through an appropriate size screen and compressed with a suitable tablet press resulting in the sustained release tablet. Alternatively the molten material may be spray congealed. It is apparent that there are disadvantages associated with this method of preparing a sustained release tablet. First, it is very difficult and hazardous to adopt this molten wax technique to mass production. Aside from the hazard of working with large quantities of molten wax there is the difficulty of working with the hard congealed-medicament mixture which must be removed from the mixing vessel and milled. A further outstanding disadvantage of the prior art method of preparing sustained release tablets, in particular by the molten wax process, is that a high dosage drug cannot be easily prepared with satisfactory release characteristics. The reason for this is that a minimum quantity of sustained release lipid material, at least 30%, is necessary to suspend the medicament. In turn, this amount of sustained release material is more than is required to provide the desired release rate and results in a slow release of the medicament.

Due to this slow down or erratic release rate the tablets prepared by these prior art methods have necessitated the formulation of two groups of granulations. An immediate release granulation must be made to give an initial dose of the drug which was not available because of the large amount of wax present. Previously known high dosage prolonged action tablets have had either alternate layers of immediate and sustained release granulations or perhaps a core made of a sustained release granulation, by the molten wax procedure, surrounded by layers of immediate release material. Still further, the heat of the molten wax would make the sustained release preparation of heat labile substances such as vitamins FIGURE 1, Prior Method I, outlines in flow sheet fashion the prior art method described above. This method of making sustained release tablets by preparing different granulations can be found in detail in United States Patents 2,887,438 and 2,951,792.

Other prior art techniques known to the art of preparing sustained release tablets require the elaborate preparation of the formula in order to make it both granular and sustained release in action. For example, the medicament is granulated either by slugging or wet granulation, the granules are sized and then sprayed with a sustained release coating material while rotating in a pan. The sprayed granules are then mixed with a lubricant and compressed.

FIGURE 1, Prior Method II, outlines in flow sheet fashion the method of preparing sustained release tablets by this method of coating the granules and compressing. The complete description of this known process can be found in United States Patent 3,108,046.

The method in accordance with this invention eliminates all of the above mentioned disadvantages associated with the prior art methods of preparing sustained release tablets. For example, all of the hazards associated with the molten wax technique and the time consuming operations which are necessary in the other disclosed methods are eliminated. A still further advantage of the process of this invention is the ability to incorporate heat labile substances such as vitamins and moisture labile materials such as acetylsalicylic acid because the process does not require any wetting or heating steps which are associated with the prior art methods of preparing sustained release tablets.

The method of this invention comprises simply preparing a dry mixture by admixing a medicament with a solid comminuted sustained release material and when necessary a tablet filler. The thoroughly mixed ingredients are then screened to remove any lumps and directly compressed on a standard tablet press. Advantageously to aid the flow of the mixture containing the sustained release material a device may be attached to the tableting machine which will assist in the free flow of the mixture through the hopper into the feed assembly and ultimately to the dies. Such a device may be either vibratory or mechanical, such as for example, a force flow feeder or induced die feeder.

This improved simplified method of preparing a sustained release tablet is also shown in flow sheet fashion in FIGURE 1, present invention. It can be seen when compared with the other well known prior art methods that many tableting steps are eliminated. It is evident that the present novel method is a rapid and inexpensive way of preparing sustained release tablets.

In accordance with this invention the sustained release material is a lipid material which is solid at room temperature. The sustained release material has a melting point of from about 40° C. to about 100° C., preferably from about 55° C. to about 88° C. and is nontoxic and pharmaceutically acceptable. The time delay lipid material is substantially water insoluble material resistant to disintegration in the gastrointestinal tract and providing for a gradual release of the medicament in said tract. The time delay material may be, for example, a wax, a fatty acid, alcohol or ester, alone, or an admixture thereof.

The wax may be paraffin wax; a petrolatum wax; a mineral wax such as ozokerite, ceresin, utah wax or montan wax; a vegetable wax such as, for example, carnauba wax, Japan wax, bayberry wax, flax wax; an animal wax such as, for example, spermaceti; or an insect wax such as beeswax, Chinese wax or shellac wax.

Additionally, the wax material may be an ester of a fatty acid having from 12 to 31 carbon atoms and a fatty alcohol having from 12 to 31 carbon atoms, the ester having a carbon atom content of from 24 to 62, or a mixture thereof. Exemplary are myricyl palmitate, ceryl palmitate, ceryl cerotate, myricyl mellissate, stearyl palmitate, stearyl myristate, lauryl laurate.

The fatty acid may have from 10 to 22 carbon atoms and may be, for example, decenoic, docosanoic, stearic, palmitate, lauric or myristic acid.

The fatty alcohols may have from 10 to 22 carbon atoms and may be, for example, lauryl alcohol, cetyl, stearyl, myristyl, myriciyl, arachyl, carnubyl or ceryl alcohol.

The esters may be mono-, di- or triglyceryl esters formed from fatty acids having from 10 to 22 carbon atoms, such as, for example, glyceryl distearate, glyceryl tristearate, glyceryl monostearate, glyceryl dipalmitate, glyceryl tripalmitate, glyceryl monopalmitate, glyceryl dilaurate, glyceryl trilaurate, glyceryl monolaurate, glyceryl didocosanoate, glyceryl tridocosanoate, glyceryl monodocosanoate, glyceryl monocaprate, glyceryl dicaprate, glyceryl tricaprate, glyceryl monomyristate, glyceryl dimyristate, glyceryl trimyristate, glyceryl monodecenoate, glyceryl didecenoate, glyceryl tridecenoate, hydrogenated castor oil, hydrogenated peanut oil and hydrogenated coconut oil.

The preferred sustained release materials are hydrogenated castor oil, glyceryl monostearate, glyceryl distearate, 12 hydroxy stearyl alcohol and microcrystalline wax.

The solid sustained release lipid material as outlined above is present from a minimum of 7% to about 95% by weight of the total solids. Preferably the time delay material is present from about 10% to about 60% by weight of the total solids.

FIGURE 2 represents a chart showing the criticality of the percentage ranges given for the above noted sustained release materials. It can be seen from these tablet disintegration tests that at the lower percent range an increase of only 2% in the amount of Sterotex present in a tablet produced a sharp jump in the amount of medicament that remains in the tablet after one hour. For example, when one increases the amount of Sterotex in the tablet from 5% to 7% the delay in medicament release increases 27%. In other words, at 5% we get a fast acting tablet and at 7% a marked delayed action tablet. It can also be noted that at the upper level of the percent range the disintegration levels off when about 95% Sterotex is present.

As noted in FIGURE 2 these tablet disintegration tests were conducted according to the procedure outlined in United States Pharmacopeia XVI. Sterotex is a hydrogenated vegetable oil, see Remington's Practice of Pharmacy, 11th Edition, 1956, page 377.

Since the sustained release lipid material is employed in a solid form only it can also act as a lubricant and it has been discovered that additional lubricants are not usually necessary in carrying out the process of this invention.

This invention is useful with any solid medicament which it is desired to provide in sustained release form. The medicament may be in the form of a base, salt or ester and may be soluble or insoluble in nature. Thus, for example, the medicament may be a tranquilizer such as chlorpromazine, a diuretic such as aminophylline, a sedative such as secobarbital, an antipyretic and analgetic such as acetylsalicylic acid, an antibiotic such as tetracycline and many more medicaments such as vitamins, sympathomimetic amines, antihistaminics, hematinics, antispasmodics, antacids and monoamine oxidase inhibitors.

The particle size of the sustained release material and medicament is critical in carrying out the process of this invention. The particle size should be of such a nature that will allow for the free flowability of the material in the hopper of the tablet machine. Further, it is essential that the particle size of both the medicament and sustained release material be approximately the same. Since this novel process involves dry mixing of the solid ingredients it is evident that if there was any great variation in size we would get a filtering effect of one material through the other when mixing. Still further, a difference in particle size between the medicament and sustained release material would not result in a homogeneous mixture. A homogenous mixture is necessary to be assured of minimum weight variation in the die cavity and thus obtaining uniform tablet sizes.

It has been found that the particle size of both the medicament and sustained release material necessary to fulfill the above requirements and carry out the above process successfully is from about 10 microns to about 1500 microns, preferably from about 100 microns to about 250 microns.

When a pharmaceutical filler or excipient is to be used it can be of any well known to the art of tableting. The filler is present from about 10% to about 90% by weight of the total solids. Preferably the filler is present from about 15% to about 40% by weight of the total solids. Exemplary of the more common fillers are precipitated calcium carbonate, lactose, powdered sugar, kaolin, magnesium carbonate, barium sulfate, diatomaceous earth and calcium sulfate dihydrate. Advantageously calcium sulfate dihydrate is the filler to be used. When a high dosage medicament is to be used a filler is not necessary. The tablet will then comprise the sustained release material and medicament.

Advantageously the final tableted product comprises a mixture of dry powders comprising a medicament, a solid sustained release material, and when necessary a filler which have been compressed into tablet form which provides both an immediate and sustained release of medicament providing a smooth eight hour release pattern which yields therapeutic activity from ten to twelve hours. The immediate dose represents approximately one third of the total dose with the remaining two thirds being released over the eight hour period.

It is to be understood that if it is desirable to vary the nature of the release rate characteristics or to overcome any incompatabilities that may be present, variations of the sustained release tablet can be made according to this invention. For example, a layered tablet or a press coated tablet both well known to the art can be prepared. In the case of layered tablets the sustained release layer can be prepared according to the process of this invention and the immediate release layer can be made according to the conventional granulation method and then compressed onto the sustained release layer. In regard to the press coated tablet, the sustained release core could be prepared according to the process of this invention and the immediate release portion compressed around the core. The tablet can comprise many shapes such as, for example, cylindrical, flat face, oval, spherical, capsule shape, heart shape, triangular and flat face.

The invention will be further clarified by the following specific examples.

*Example 1*

Ingredients:                            Mg./tablet
    Acetaminophen _____ 162.5
    Salicylamide _____ 235.0
    Glyceryl monostearate _____ 55.0

The glyceryl monostearate is micropulverized and thoroughly mixed with the other ingredients. The mixed ingredients are then compressed into tablets using a standard tablet press.

*Example 2*

Ingredients:                            Mg./tablet
    Acetylsalicylic acid _____ 750
    Hydrogenated castor oil _____ 45

The hydrogenated castor oil is micropulverized and mixed with the acetylsalicylic acid. The well mixed ingredients are then compressed into tablets using a standard tablet press.

*Example 3*

Ingredients:                            Mg./tablet
    Prochlorperazine maleate _____ 75
    Glyceryl distearate _____ 120
    Calcium sulfate dihydrate _____ 100

The glyceryl distearate is micropulverized and mixed with the other ingredients. The thoroughly mixed ingredients are then compressed into tablets using a standard tablet press.

*Example 4*

Ingredients:                            Mg./tablet
    Trans-2-phenylcyclopropylamine _____ 25
    Lactose _____ 200
    Glyceryl tristearate _____ 128

The glyceryl tristearate is micropulverized and mixed well with the other ingredients. The mixture is then compressed using a standard tablet press.

What is claimed is:

1. In a method of preparing compressed sustained release pharmaceutical tablets having a medicament dispersed throughout a non-granulated comminuted material which is resistant to disintegration and slowly dispersible in the gastrointestinal tract and which has not been previously subjected to compression the improvement which consists essentially of mixing uniformly from at least about 7% to about 95% of a solid sustained release material having a particle size of from about 10 microns to about 1500 microns and being resistant to disintegration and slowly dispersible in the gastrointestinal tract with a medicament having a particle size of from about 10 microns to about 1500 microns and then compressing said mixture into a tablet.

2. In a method of preparing compressed sustained release pharmaceutical tablets having a medicament dispersed throughout a non-granulated comminuted lipid material resistant to disintegration and slowly dispersible in the gastrointestinal tract and which has not been previously subjected to compression the improvement which consists essentially of mixing uniformly from at least about 7% to about 95% of a solid lipid material selected from the group consisting of hydrogenated castor oil, 12 hydroxy stearyl alcohol, glyceryl monostearate, glyceryl distearate and microcrystalline wax, said material having a particle size of from about 10 microns to about 1500 microns and being resistant to disintegration and slowly dispersible in the gastrointestinal tract, with a medicament having a particle size of from 10 microns to about 1500 microns and then compressing said mixture into a tablet.

3. A sustained release pharmaceutical tablet comprising a medicament dispersed throughout a solid sustained release lipid material made in accordance with the process of claim 1.

References Cited by the Examiner
UNITED STATES PATENTS
3,108,046  10/1963  Harbit _____ 167—82

JULIAN S. LEVITT, *Primary Examiner.*

GEORGE A. MENTIS, *Assistant Examiner.*